US012664366B2

(12) United States Patent
Nakov et al.

(10) Patent No.: US 12,664,366 B2
(45) Date of Patent: Jun. 23, 2026

(54) CROSS-DOMAIN LABEL-ADAPTIVE STANCE DETECTION

(71) Applicant: Qatar Foundation for Education, Science and Community Development, Doha (QA)

(72) Inventors: Preslav I. Nakov, Doha (QA); Momchil Hardalov, Doha (QA); Isabelle Augenstein, Doha (QA); Arnav Arora, Doha (QA)

(73) Assignee: HAMAD BIN KHALIFA UNIVERSITY, Doha (QA)

( * ) Notice: Subject to any disclaimer, the term of this patent is extended or adjusted under 35 U.S.C. 154(b) by 314 days.

(21) Appl. No.: 17/871,206

(22) Filed: Jul. 22, 2022

(65) Prior Publication Data

US 2023/0036352 A1     Feb. 2, 2023

Related U.S. Application Data

(60) Provisional application No. 63/224,535, filed on Jul. 22, 2021.

(51) Int. Cl.
| | |
|---|---|
| *G06F 40/30* | (2020.01) |
| *G06F 40/205* | (2020.01) |
| *G06F 40/284* | (2020.01) |
| *G06N 3/0455* | (2023.01) |
| *G06N 3/08* | (2023.01) |
| *G06N 3/088* | (2023.01) |

(Continued)

(52) U.S. Cl.
CPC .......... *G06F 40/284* (2020.01); *G06F 40/205* (2020.01); *G06N 3/08* (2013.01)

(58) Field of Classification Search
None
See application file for complete search history.

(56) References Cited

U.S. PATENT DOCUMENTS

| | | | |
|---|---|---|---|
| 10,832,001 B2 | 11/2020 | Dadachev et al. | |
| 11,687,730 B1 * | 6/2023 | Yang ...................... | G06N 20/00 |
| | | | 704/9 |

(Continued)

OTHER PUBLICATIONS

Augenstein, et al. "Multi-task Learning of Pairwise Sequence Classification Tasks Over Disparate Label Spaces"; In Proc. of the 2018 Conf of the North American Chapter of the Association for Computational Linguistics: Human Language Technologies.; vol. 1; (11 pages).

(Continued)

*Primary Examiner* — Pierre Louis Desir
*Assistant Examiner* — Kristen Michelle Masters
(74) *Attorney, Agent, or Firm* — K&L Gates LLP

(57) ABSTRACT

Cross-domain label-adaptive stance detection is provided by receiving a natural language input; tokenizing the natural language input by a shared tokenizer to identify tokens in the natural language input; parsing the tokens by a plurality of domain expert encoder blocks to produce a corresponding plurality of domain encodings for the natural language input; parsing the tokens by a global encoder block to produce a global encoding for the natural language input; processing the plurality of domain encodings and the global encoding by a label embedding layer to produce a probability distribution for a stance of the natural language input; and outputting the stance for the natural language input.

20 Claims, 3 Drawing Sheets

(51) Int. Cl.
    *G06N 3/094*        (2023.01)
    *G06N 3/096*        (2023.01)

(56)                 References Cited

U.S. PATENT DOCUMENTS

| | | |
|---|---|---|
| 2020/0004770 A1 | 1/2020 | Bohannon et al. |
| 2020/0202071 A1 | 6/2020 | Ghulati |
| 2021/0019339 A1 | 1/2021 | Ghulati et al. |
| 2021/0256369 A1* | 8/2021 | Ardel .................... G06N 3/0985 |
| 2021/0390270 A1* | 12/2021 | Fei ......................... G06F 40/197 |
| 2022/0261551 A1* | 8/2022 | Liu ......................... G06F 40/30 |
| 2023/0022845 A1* | 1/2023 | Meng ..................... G06Q 10/10 |
| 2023/0394333 A1* | 12/2023 | Jiao ..................... G06F 16/9532 |

OTHER PUBLICATIONS

Zhang, et al.; "Enhancing Cross-target Stance Detection with Transferable Semantic-Emotion Knowledge"; Proc. of the 58th Annual Meeting of the Assoc. for Comp. Linguistics; 2020; (10 pages).
Xu, et al.; "Adversarial Domain Adaptation for Stance Detection"; 32nd Conf. on Neural Inf. Proc. Sys.; 2018; (6 pages).

* cited by examiner

200

210 — Receive Natural Language Input

220 — Tokenize Natural Language Input

230 — Parse Tokens with N Domain Experts

240 — Parse Tokens with Global Encoding Block

250 — Process Encodings with Shared Label Embedding Layer

260 — Output Stance Expressed

CROSS-DOMAIN LABEL-ADAPTIVE STANCE DETECTION

CROSS-REFERENCES TO RELATED APPLICATIONS

The present disclosure claims priority to U.S. Provisional Patent Application 63/224,535 having the title "CROSS-DOMAIN LABEL-ADAPTIVE STANCE DETECTION SYSTEMS AND METHODS", which was filed on Jul. 22, 2021 and is incorporated herein by reference in its entirety.

BACKGROUND

Stance detection, a well-studied problem in natural language processing (NLP), concerns the classification of a writer's viewpoint towards a target. There are many different scenarios in which it is useful to study the attitude expressed in texts (e.g., of politicians with respect to newly proposed legislation, of customers regarding new products, or of the general public towards public health measures (e.g., aiming to reduce the spread of COVID-19)). Stance detection has been studied in many different forms, meaning not just for different domains, but with more substantial differences in settings—e.g., stance (i) expressed in tweets vs. long news articles, (ii) with respect to a claim vs. a topic (either explicit or implicit). Moreover, there is substantial variation in (iii) the label inventory, in the exact label definition, in the data collection and in the annotation setup, in the domain, etc. An important factor is that the label inventories differ between the different settings. The possible labels include not only variants of 'positive', 'negative', and 'neutral', but also ones that are difficult to cross-map, such as 'discuss', and 'question'. All these aspects hinder cross-domain studies, as they require changes to standard domain adaptation approaches.

SUMMARY

The present disclosure provides systems and methods that include an end-to-end framework for cross-domain label-adaptive stance detection. In some aspects, the framework is unsupervised. The provided system may enable out-of-domain prediction of unseen, user-defined labels. In various aspects, the provided system combines domain adaptation techniques such as mixture of experts and domain-adversarial training with label embeddings, leading to sizable performance gains over strong baselines—both (i) in-domain, i.e., for seen targets, and (ii) out-of-domain, i.e., for unseen targets.

In various aspects, a method, a system including a processor and a memory storing instructions that when executed by the processor perform various operations, or a computer-readable storage device that stores instructions that when executed by a processor performs various operations are provided. The method or operations system include: receiving a natural language input; tokenizing the natural language input by a shared tokenizer to identify tokens in the natural language input; parsing the tokens by a plurality of domain expert encoder blocks to produce a corresponding plurality of domain encodings for the natural language input; parsing the tokens by a global encoder block to produce a global encoding for the natural language input; processing the plurality of domain encodings and the global encoding by a label embedding layer to produce a probability distribution for a stance of the natural language input; and outputting the stance for the natural language input Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

The present disclosure provides systems and methods that include an end-to-end framework for cross-domain label-adaptive stance detection. The provided system architecture may be based on input representations from a pre-trained language model, and may be adapted to source domains using Mixture of Experts (MoE) and domain adversarial training. Self-adaptive output representations obtained via label embeddings may also be used, as well as unsupervised alignment between seen and unseen target labels for out-of-domain datasets.

Unlike typical systems, the provided system enables learning the relationship between datasets and their label inventories in an unsupervised fashion. Moreover, the MoE architecture is more compact than those used in typical systems. For instance, the provided system includes a parameter-efficient architecture with layers shared between experts. In some aspects, the provided system predicts from a set of unseen user-defined targets. With this framework, the provided system helps solve two challenges: (i) training domain-adaptive models over a large number of datasets from a variety of source domains, and (ii) predicting an unseen label from a disjoint set of n unique labels, among other benefits.

MoE is a well-known technique for multi-source domain adaptation. The provided system, however, includes several changes to MoE to improve the model's parameter efficiency and reduce training and interference times. In some aspects, the provided system uses a shared encoder instead of a separate large Transformer model for each domain. In some aspects, for each domain expert and the global shared model, the provided system may include a single Transformer layer on top of the encoder block. The provided system thereby retains the domain experts while sharing information through the encoder. This approach reduces the number of parameters by a factor of the size of the entire model divided by the size of a single layer. Accordingly, the provided system improves the efficiency of the computing devices used to solve multi-domain adaptation tasks, and reduces the amount of memory and storage space used to run and maintain the model, among other benefits.

In multi-task learning, each task typically has its own task-specific labels (e.g., dataset-specific labels), which are predicted in a joint model using separate output layers. However, these dataset-specific labels are not entirely orthogonal to each other. Therefore, the provided system adopts label embeddings to encourage the model to learn task relations in an unsupervised fashion using a common vector space. In one example, the provided system includes a Label Embeddings Layer (LEL), which learns a label compatibility function between the hidden representation of the input and an embedding matrix.

Figure 1:
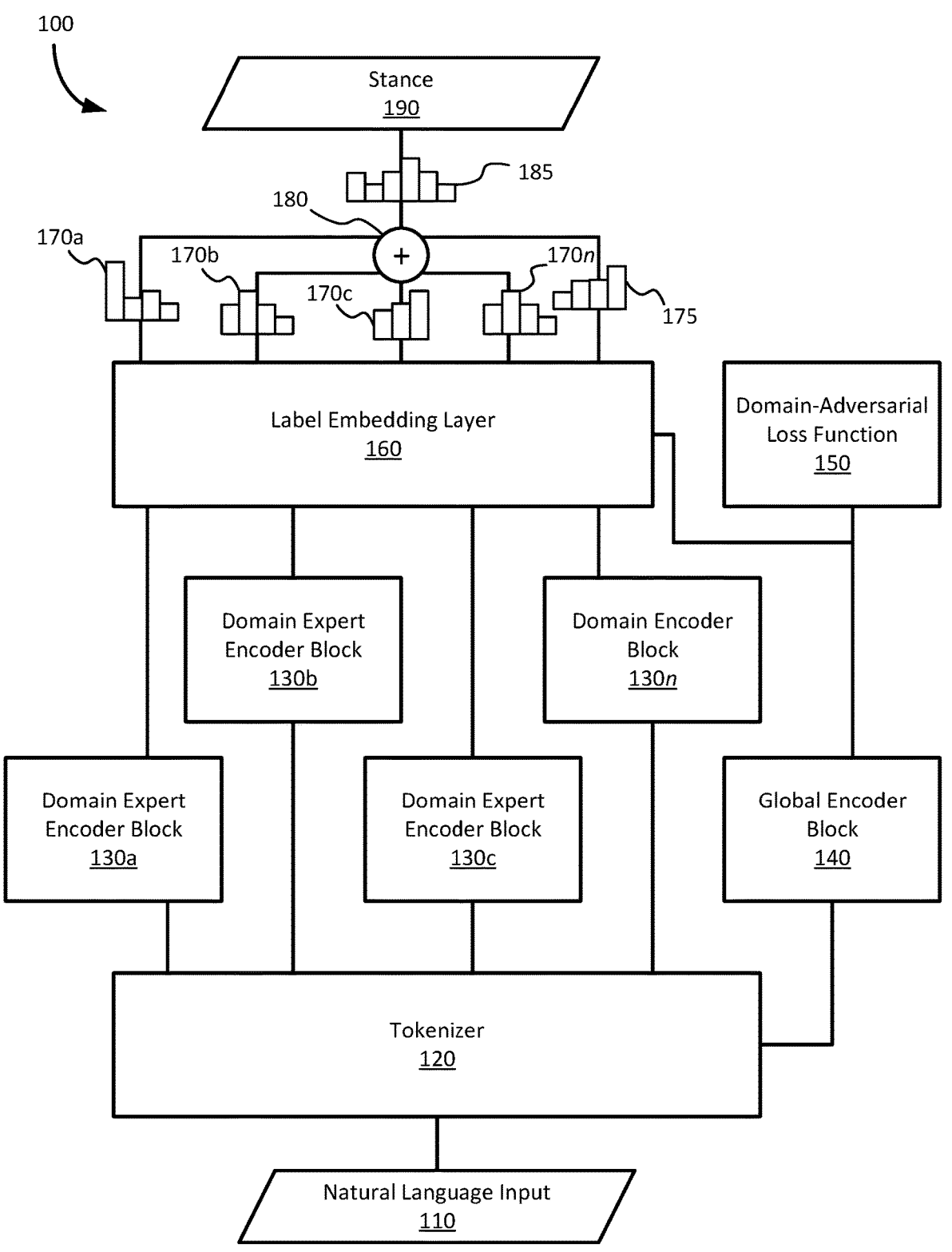
FIG. 1 illustrates an architecture of a natural language analysis model 100, according to aspects of the present disclosure

FIG. 1 illustrates an architecture of a natural language analysis model 100, according to aspects of the present disclosure. As illustrated, a natural language input 110 is received by a tokenizer 120, which divides the natural language input 110 into a shared tokenized representation that will be independently analyzed by n domain expert encoder blocks 130a-n (generally or collectively, domain expert encoder blocks 130) and one global encoder block 140. A label embedding layer 160 receives the outputs from the domain expert encoder blocks 130 and global encoder block 140 to apply the potential labels used in each model (which may overlap or be unique from the labels used by the other blocks) to the associated probabilities 170a-n for the corresponding domain expert encoder blocks 130a-n and the global probability 175 for the global encoder block 140. A combing function 180 (e.g., e.g., mean average, weighted average, or attention based combination) to produce final distribution 185, from which the highest probability label is selected as the stance 190 for the natural language input 110. In various aspects, the combining function 180 may determining a mean average to gather the final distribution 185 across the label space according to Formula 1m where K is the number of domains, $p_k(x)$ is the probability for a certain label x from domain expert encoder block 130k, $p_g(x)$ is the probability for a certain label x from the global encoder block 140.

$$p_A\left(x, \bar{K}\right) = \frac{1}{|\bar{K}|+1} \sum_{k \in \bar{K}} (p_k(x) + p_g(x)) \qquad \text{Formula 1}$$

By using a shared encoder via the label embedding layer 170 rather than a separate larger transformer model for each domain, the present disclosure thereby retains the individual domain experts while sharing information through the encoder. This approach reduces the number of parameters by a factor of the size of the entire model divided by the size of a single layer, (e.g., the model uses K+L layers instead of K*L layers, where L is the number of layers in the tokenizer 120).

Each domain expert encoder block 130 and the global encoder block 140, as domain experts, receives as input the representations from the tokenizer 120 of all tokens in the original natural language input 110. The tokenizer 120 identifies the sentence level classifications from the natural language input 110, which are output as [CLS] tokens. The domain experts provide domain-specific and global representations for the natural language input 110 from the [CLS] tokens. These hidden representations are denoted according to Formula 2, where K is the number of domains, and dh is the hidden size of the model.

$$H \in \mathbb{R}^{K \times d_h} \qquad \text{Formula 2}$$

4

These hidden representations are passed through a single label embedding layer 160 to obtain the probability distributions 170a-n and 175.

A domain-adversarial loss function 150 is included to force the model to learn domain-invariant representations, both for the source and the target domains. The latter is done by configuring the domain-adversarial adversarial loss function to minimize the task objective $f_g$, and maximize the confusion in the domain classifier fa for an input sample x according to Formula 3.

$$L_D = \min_{\Theta_D} \min_{\Theta_G} - d\log f_d(f_g(x)) \qquad \text{Formula 3}$$

In various aspects, the domain-adversarial loss function 150 is implemented with a gradient reversal layer, which ensures that the source and the target domains are made to be similar.

In multi-task learning, each task typically has its own task-specific labels (e.g., dataset-specific labels for the stance 190 of a natural language input 110), which are predicted in a joint model using separate output layers. However, these dataset-specific labels are not entirely orthogonal to each other, and therefore the presently described model adopts shared label embeddings to encourage the model to learn task relations in an unsupervised fashion using a common vector space. The label embedding layer 160 learns a label compatibility function between the hidden representation of the input h, (e.g., the one from the [CLS] token) and an embedding matrix L according to Formula 4, where $L \in \mathbb{R}^{(\Sigma_i L_i) \times h}$ is the shared label embedding matrix for all datasets, and i is a hyper-parameter for the dimensionality of each vector.

$$p = \text{softmax}(Lh) \qquad \text{Formula 4}$$

In various aspects, the label embedding layer 160 sets a size of the embeddings to match the hidden size of the model, and obtains the hidden representation h from the last layer of the pre-trained language model. The label embedding layer 160 may be trained for a cross entropy objective over all labels, to thereby mask the unrelated labels and keep visible only the labels from the target datasets for a sample in the batch. Similar masking procedures can be used at inference time, which can include hard mapping options, soft mapping options, weak mapping options, etc.

In various aspects, the model is trained in an unsupervised out-of-domain setting, in there is no direct way of obtaining a probability distribution over the set of test labels. Label embeddings are an alternative for obtaining these predictions, as they can be used to measure the similarity between source and target labels. Accordingly, the model may use hard mappings, soft mappings, weak mappings or combinations thereof in various aspects.

In aspects using hard mapping, a supervised option defines a set of meta-groups (hard labels), on which to train the model (e.g., positive, negative, discuss, other, neutral). When analyzing an out-of-domain dataset, its labels are replaced with meta-group labels on which the model is to be trained, thus the model can directly use the predictions from the model for out-of-domain datasets for training.

In aspects using soft mapping, the model measures the similarity between the names of the labels across datasets (e.g., "pro" and "con" in a first set of labels may correspond to "for" and "against" or "agree" and "disagree" in other sets). For example, given a set of out-of-domain target labels $Y^T \in \{y_1^T \ldots y_n^T\}$ and a set of predictions from in-domain labels $P_\delta \in \{p_1^\delta, \ldots p_m^\delta\}$, $p_i^\delta \in \{y_1^\delta, \ldots y_j^\delta\}$, the labe with the highest cosine similarity to the predicted label $p_i^\delta$ from $Y_T$ is selected, according to Formula 5, where k is the number of out-of-domain labels, m is the number of out-of-domain examples, and j is the number of in-domain labels.

$$p_i^T = \mathrm{argmaxcos}_{y^T \in Y^T} \left(y^T, p_i^T\right) \qquad \text{Formula 5}$$

The soft mapping procedure can generalize to any labels, without the need for additional supervision.

In aspects using weak mapping, the mapping procedure only takes label names into account, in contrast to the hard labels that rely on human expertise. Accordingly, by measuring label similarities as in soft mapping, but incorporating some supervision to define the embeddings, weak mapping may combine benefits of both hard and soft mapping approaches. For example, by dividing first group the labels into C categories to define their nearest neighbors and then, from the group of the predicted label, the model then chooses the most similar label for the target domain among the neighbors. In some aspects, because there is no guarantee that there will be a match for the target domain within the same group, the model can further define group-level neighborhoods.

In various aspects, the model is trained using a loss function that is a weighted sum of three components, shown in Formulas 5, 6, an d7

$$L_s = \frac{1}{N}\sum_i y_i \log px(x, S') \qquad \text{Formula 5}$$

$$L_t = \frac{1}{N}\sum_i y_i \log pt(x) \qquad \text{Formula 6}$$

$$L = \lambda L_s + (1 - \lambda)L_t + \gamma L_D \qquad \text{Formula 7}$$

The source domain loss $(L_s)$ is combined with the meta-target loss from the domain expert subnetwork $(L_t)$, where the contribution of each is balanced by a single hyperparameter $\lambda$, which, in some aspects, is set to 0.5. The domain adversarial loss $(L_D)$ is then added, and multiplied by a weighting factor $\gamma$, which is set to a small positive number (e.g., 0.01) to prevent the regularizer from dominating the overall loss. When using a diverse dataset, the model may be trained to fit the domain-adaptive loss towards a metaclass for each dataset, instead of the domain.

Figure 2:
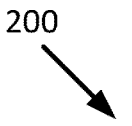
FIG. 2 is a flowchart of a method for cross-domain label-adaptive stance detection, according to aspects of the present disclosure.
Figure 2:
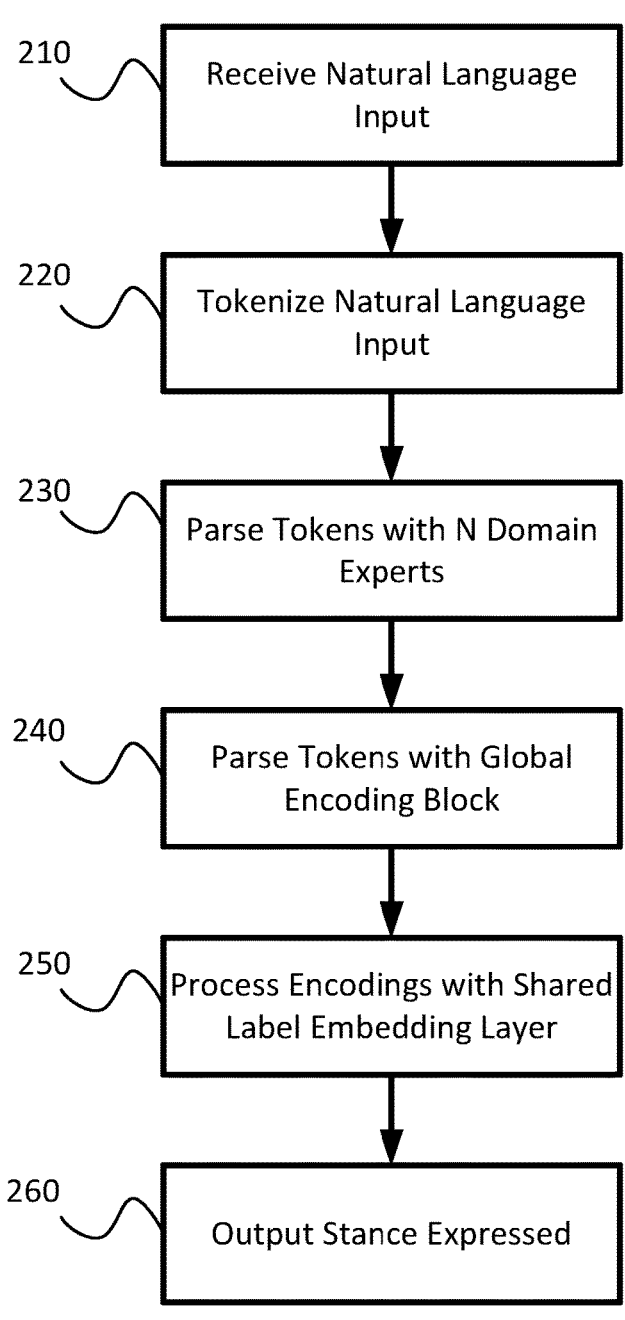

FIG. 2 is a flowchart of a method 200 for cross-domain label-adaptive stance detection, according to aspects of the present disclosure. Method 200 begins at operation 210, where the model receives a natural language input 110.

At operation 220, the model tokenizes the natural language input 110 by a shared tokenizer 120 to identify tokens in the natural language input 110. In various aspects, the shared tokenizer 120 identifies separate sentences and independent clauses in the natural language input 110, and provides each sentence or independent clause or individual analysis for analysis of an associated stance 190 therein. Additionally or alternatively, the stances 190 of two or more sentences or independent clauses in a given natural language input 110 can be analyzed together to identify an overall stance 190 for the natural language input 110. For example, a paragraph of M sentences may be analyzed to produce at least M stances 190 for each sentence or independent clause, and/or to produce one stance 190 for the paragraph as a whole.

At operation 230, the model parses the tokens by a plurality of N domain expert encoder blocks 130 to produce a corresponding plurality of domain encodings for the natural language input 110.

At operation 240, the model parses the tokens by a global encoder block 140 to produce a global encoding for the natural language input 110.

In various aspects, each domain encoding of the plurality of domain encodings includes a set of probabilities for whether the natural language input 110 exhibits a candidate stance from a plurality of stances used by a corresponding domain expert encoder block 130. Similarly, the global encoding produced by the global encoder block 140 may include probabilities for whether the natural language input 110 exhibits a candidate stance from the plurality of stances used by the plurality of domain expert encoder blocks 130.

At operation 250, the model processes the plurality of domain encodings and the global encoding by a label embedding layer 160 to produce a probability distribution for a stance of the natural language input. In various aspects, the label embedding layer 160 acts as a shared encoder for the different expert models, and is a domain-adversarial neural network (DANN) trained via a domain-adversarial loss function 150 to minimize a task objective and maximize a confusion level in a domain classifier.

At block 260, the model outputs the stance 190 determined to be expressed for the natural language input 110. Because several domain experts are analyzing the same natural language input 110, there may be some disagreement in the outputs from the domain expert encoder block 130 and the global encoder block 140 for how to encode the detected stance or what the detected stance 190 is. For example, a first domain expert encoder block 130a may determine that the stance 190 is most likely "agree", while a second domain expert encoder block 130b may determine that the stance is most likely "concur". Accordingly, in some aspects, the stance 190 is associated with a first name in a first domain expert encoder block 130a of the plurality of domain expert encoder blocks 130 and not with the first name in a second domain expert encoder block 130b of the plurality of domain expert encoder blocks 130 (as an example of using different encodings for the same general stance 190). Continuing the example, a third domain expert encoder block 130c may determine that the stance is most likely "against" with "agree" as a second-most likely stance 190 (as an example of making a different determination of what the detected stance 190 is). Accordingly, in some aspects, the stance 190 is associated with a first name in a first domain expert encoder block 130a of the plurality of domain expert encoder blocks 130 and with a second name in a second domain expert encoder block 130b of the plurality of domain expert encoder blocks 130.

Similarly, some domain expert encoder blocks 130 may lack equivalents for candidate stances 190 used by other domain expert encoder blocks 130. For example, a first domain expert encoder block 130a may only identify candidate stances 190 as "agree" or "disagree", while a second domain expert encoder block 130b may identify candidate stances 190 as "agree," "disagree", and "present external opinion" to indicate that the stance 190 indicated in the natural language input 110 is not that of the author but of another party who the author wishes to cite to. Consider then the example sentence of "Although some say that option A is superior, it is clear that option B is the better choice". In this case, if the first domain expert encoder block 130*a* indicates that the stance 190 is "disagree" and the second domain expert encoder block 130*b* indicates that the stance 190 is "present external opinion", and the ultimate determination for the stance 190 is "present external opinion", the model may output a stance 190 that is associated with a category outside of a classification scheme used by at least the first domain expert encoder block 130*a*.

Additionally, patterns in disagreement or agreement between the various probabilities used by the encoder blocks can be used to identify categories for stances that are outside of (e.g., not specifically identified by) any classification scheme used by any domain expert encoder block 130 of the plurality of domain expert encoder blocks 130. Using the previous example, the model may identify two different possibilities based on the determined encodings to reflect the first and second domain expert encoder blocks 130*a-b* identifying "agree" and "present external opinion" or "disagree" and "present external opinion", respectively. Accordingly, the output stance 190 may be output as "present external opinion to agree with" or "present external opinion to disagree with", which are outside of either the classification schemes for the encoder blocks 130.

Figure 3:
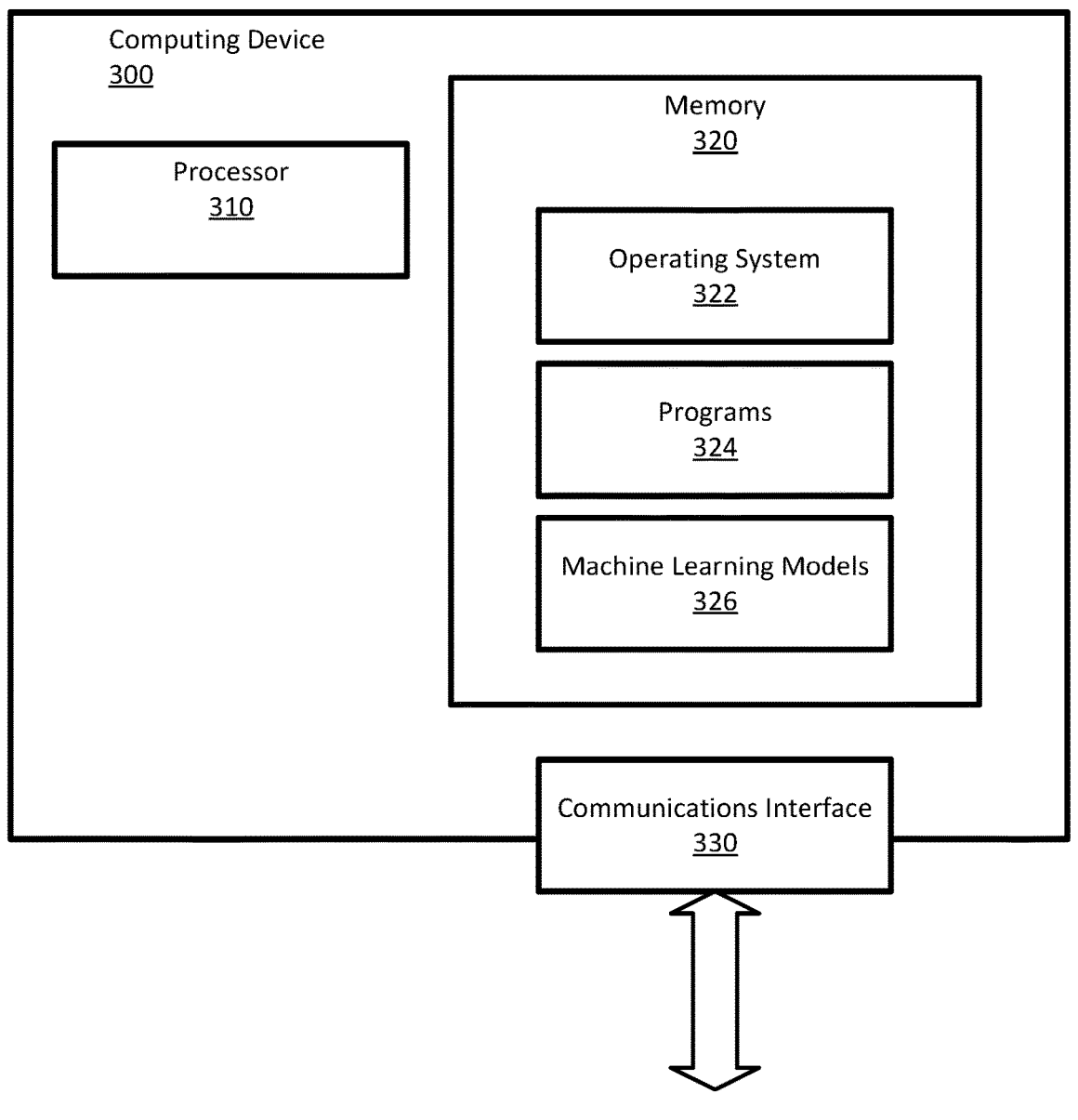
FIG. 3 illustrates a computer system, according to aspects of the present disclosure

FIG. 3 illustrates a computer system 300, such as may be used to perform method 200 described in relation to FIG. 2, according to aspects of the present disclosure. The computer system 300 may include at least one processor 310, a memory 320, and a communication interface 330. In various aspects, the physical components may offer virtualized versions thereof, such as when the computer system 300 is part of a cloud infrastructure providing virtual machines (VMs) to perform some or all of the tasks or operations described for the various devices in the present disclosure.

The processor 310 may be any processing unit capable of performing the operations and procedures described in the present disclosure. In various aspects, the processor 310 can represent a single processor, multiple processors, a processor with multiple cores, and combinations thereof. Additionally, the processor 310 may include various virtual processors used in a virtualization or cloud environment to handle client tasks.

The memory 320 is an apparatus that may be either volatile or non-volatile memory and may include RAM, flash, cache, disk drives, and other computer readable memory storage devices. Although shown as a single entity, the memory 320 may be divided into different memory storage elements such as RAM and one or more hard disk drives. Additionally, the memory 320 may include various virtual memories used in a virtualization or cloud environment to handle client tasks. As used herein, the memory 320 is an example of a device that includes computer-readable storage media, and is not to be interpreted as transmission media or signals per se.

As shown, the memory 320 includes various instructions that are executable by the processor 310 to provide an operating system 322 to manage various operations of the computer system 300 and one or more programs 324 to provide various features to users of the computer system 300, which include one or more of the features and operations described in the present disclosure. One of ordinary skill in the relevant art will recognize that different approaches can be taken in selecting or designing a program 324 to perform the operations described herein, including choice of programming language, the operating system 322 used by the computer system 300, and the architecture of the processor 310 and memory 320. Accordingly, the person of ordinary skill in the relevant art will be able to select or design an appropriate program 324 based on the details provided in the present disclosure.

Additionally, the memory 320 can include one or more of machine learning models 326 for detecting the stance 190 of a natural language input 110, as described in the present disclosure. As used herein, the machine learning models 326 may include various algorithms used to provide "artificial intelligence" to the computer system 300, which may include Artificial Neural Networks, decision trees, support vector machines, genetic algorithms, Bayesian networks, or the like. The models may include publically available services (e.g., via an Application Program Interface with the provider) as well as purpose-trained or proprietary services. One of ordinary skill in the relevant art will recognize that different domains may benefit from the use of different machine learning models 326, which may be continuously or periodically trained based on received feedback. Accordingly, the person of ordinary skill in the relevant art will be able to select or design an appropriate machine learning model 326 based on the details provided in the present disclosure.

The communication interface 330 facilitates communications between the computer system 300 and other devices, which may also be computer system 300 as described in relation to FIG. 3. In various aspects, the communication interface 330 includes antennas for wireless communications and various wired communication ports. The computer system 300 may also include or be in communication, via the communication interface 330, one or more input devices (e.g., a keyboard, mouse, pen, touch input device, etc.) and one or more output devices (e.g., a display, speakers, a printer, etc.).

Accordingly, the computer system 300 is an example of a system that includes a processor 310 and a memory 320 that includes instructions that (when executed by the processor 310) perform various aspects of the present disclosure. Similarly, the memory 320 is an apparatus that includes instructions that when executed by a processor 310 perform various aspects of the present disclosure.

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follows:

1. A method, comprising:

receiving a natural language input;

tokenizing an entirety of the natural language input by a shared tokenizer to identify tokens in the natural language input;

parsing an entirety of the tokens by a plurality of domain expert encoder blocks to produce a corresponding plurality of domain encodings for the natural language input;

parsing the entirety of the tokens by a global encoder block to produce a global encoding for the natural language input separately and in parallel to the parsing of the entirety of the tokens by the plurality of domain expert encoder blocks;

processing the plurality of domain encodings and the global encoding by a shared label embedding layer to produce a probability distribution for a stance of the natural language input, wherein the shared label embedding layer receives the plurality of domain encodings and the global encoding separately and in parallel, and wherein the shared label embedding layer masks unrelated labels and keeps visible only labels from target datasets for a sample in the received natural language input; and outputting the stance for the natural language input, wherein the shared tokenizer, the plurality of domain expert encoder blocks, the global encoder block, and the shared label embedding layer comprise an architecture of a natural language analysis model.

2. The method of claim 1, wherein each domain encoding of the plurality of domain encodings includes a set of probabilities for whether the natural language input exhibits a candidate stance from a plurality of stances used by a corresponding domain expert encoder block of the plurality of domain expert encoder blocks.

3. The method of claim 1, wherein the label embedding layer is a domain-adversarial neural network (DANN) trained via a domain-adversarial loss function to minimize a task objective and maximize a confusion level in a domain classifier.

4. The method of claim 1, wherein the stance is associated with a first name in a first domain expert encoder block of the plurality of domain expert encoder blocks and with a second name in a second domain expert encoder block of the plurality of domain expert encoder blocks.

5. The method of claim 1, wherein the stance is associated with a category outside of a classification scheme used by at least one domain expert encoder block of the plurality of domain expert encoder blocks.

6. The method of claim 5, wherein the stance is associated with a category outside of any classification scheme used by any domain expert encoder block of the plurality of domain expert encoder blocks.

7. The method of claim 1, wherein the stance is associated with a first name in a first domain expert encoder block of the plurality of domain expert encoder blocks and not with the first name in a second domain expert encoder block of the plurality of domain expert encoder blocks.

8. A system, comprising:

a processor; and a memory including instructions that when executed by the processor, the system performs operations including:

receiving a natural language input;

tokenizing an entirety of the natural language input by a shared tokenizer to identify tokens in the natural language input;

parsing an entirety of the tokens by a plurality of domain expert encoder blocks to produce a corresponding plurality of domain encodings for the natural language input;

parsing the entirety of the tokens by a global encoder block to produce a global encoding for the natural language input separately and in parallel to the parsing of the entirety of the tokens by the plurality of domain expert encoder blocks;

processing the plurality of domain encodings and the global encoding by a shared label embedding layer to produce a probability distribution for a stance of the natural language input, wherein the shared label embedding layer receives the plurality of domain encodings and the global encoding separately and in parallel, and wherein the shared label embedding layer masks unrelated labels and keeps visible only labels from target datasets for a sample in the received natural language input; and outputting the stance for the natural language input, wherein the shared tokenizer, the plurality of domain expert encoder blocks, the global encoder block, and the shared label embedding layer comprise an architecture of a natural language analysis model.

9. The system of claim 8, wherein each domain encoding of the plurality of domain encodings includes a set of probabilities for whether the natural language input exhibits a candidate stance from a plurality of stances used by a corresponding domain expert encoder block of the plurality of domain expert encoder blocks.

10. The system of claim 8, wherein the label embedding layer is a domain- adversarial neural network (DANN) trained via a domain-adversarial loss function to minimize a task objective and maximize a confusion level in a domain classifier.

11. The system of claim 8, wherein the stance is associated with a first name in a first domain expert encoder block of the plurality of domain expert encoder blocks and with a second name in a second domain expert encoder block of the plurality of domain expert encoder blocks.

12. The system of claim 8, wherein the stance is associated with a category outside of a classification scheme used by at least one domain expert encoder block of the plurality of domain expert encoder blocks.

13. The system of claim 12, wherein the stance is associated with a category outside of any classification scheme used by any domain expert encoder block of the plurality of domain expert encoder blocks.

14. The system of claim 8, wherein the stance is associated with a first name in a first domain expert encoder block of the plurality of domain expert encoder blocks and not with the first name in a second domain expert encoder block of the plurality of domain expert encoder blocks.

15. A non-transitory computer-readable storage device including instructions that when executed by a processor performs operations comprising:

receiving a natural language input;

tokenizing an entirety of the natural language input by a shared tokenizer to identify tokens in the natural language input;

parsing an entirety of the tokens by a plurality of domain expert encoder blocks to produce a corresponding plurality of domain encodings for the natural language input;

parsing the entirety of the tokens by a global encoder block to produce a global encoding for the natural language input separately and in parallel to the parsing of the entirety of the tokens by the plurality of domain expert encoder blocks;

processing the plurality of domain encodings and the global encoding by a shared label embedding layer to produce a probability distribution for a stance of the natural language input, wherein the shared label embedding layer receives the plurality of domain encodings and the global encoding separately and in parallel, and wherein the shared label embedding layer masks unrelated labels and keeps visible only labels from target datasets for a sample in the received natural language input; and outputting the stance for the natural language input, wherein the shared tokenizer, the plurality of domain expert encoder blocks, the global encoder block, and the shared label embedding layer comprise an architecture of a natural language analysis model.

16. The non-transitory computer-readable storage device of claim 15, wherein each domain encoding of the plurality of domain encodings includes a set of probabilities for whether the natural language input exhibits a candidate stance from a plurality of stances used by a corresponding domain expert encoder block of the plurality of domain expert encoder blocks.

17. The non-transitory computer-readable storage device of claim 15, wherein the label embedding layer is a domain-adversarial neural network (DANN) trained via a domain-adversarial loss function to minimize a task objective and maximize a confusion level in a domain classifier.

18. The non-transitory computer-readable storage device of claim 15, wherein the stance is associated with a first name in a first domain expert encoder block of the plurality of domain expert encoder blocks and with a second name in a second domain expert encoder block of the plurality of domain expert encoder blocks.

19. The non-transitory computer-readable storage device of claim 15, wherein the stance is associated with a category outside of a classification scheme used by at least one domain expert encoder block of the plurality of domain expert encoder blocks.

20. The non-transitory computer-readable storage device of claim 15, wherein the stance is associated with a first name in a first domain expert encoder block of the plurality of domain expert encoder blocks and not with the first name in a second domain expert encoder block of the plurality of domain expert encoder blocks.

* * * * *